(12) United States Patent
Yeung

(10) Patent No.: US 7,246,802 B2
(45) Date of Patent: Jul. 24, 2007

(54) TOWABLE BAG

(76) Inventor: Ka Wai David Yeung, Flat B, 1/f., Block 8, Constellation Cove, 1 Hung Lam Drive, Tai Po Kau, Tai Po, N.T., Hong Kong (HK)

( * ) Notice: Subject to any disclaimer, the term of this patent is extended or adjusted under 35 U.S.C. 154(b) by 115 days.

(21) Appl. No.: 10/966,378

(22) Filed: Oct. 15, 2004

(65) Prior Publication Data
US 2006/0081664 A1 Apr. 20, 2006

(51) Int. Cl.
*B62D 51/04* (2006.01)

(52) U.S. Cl. ............... 280/1.5; 190/18 A; 190/108

(58) Field of Classification Search ............... 280/1.5; 190/18 A, 108
See application file for complete search history.

(56) References Cited

U.S. PATENT DOCUMENTS

| 2,613,953 | A | | 10/1952 | Giovannoni | |
|---|---|---|---|---|---|
| 3,328,043 | A | | 6/1967 | Johnson | |
| 3,856,191 | A | | 12/1974 | Pohl | |
| 3,924,872 | A | * | 12/1975 | Sollazzi et al. | ............ 190/18 A |
| 3,926,448 | A | | 12/1975 | Reichard | |
| 4,236,723 | A | * | 12/1980 | Lemmon | ..................... 280/1.5 |
| 5,215,318 | A | * | 6/1993 | Capraro | ..................... 280/1.5 |
| 5,375,861 | A | * | 12/1994 | Gifford | ..................... 280/47.38 |
| 5,622,294 | A | * | 4/1997 | Evans | ......................... 224/184 |
| 6,139,033 | A | * | 10/2000 | Western | ................... 280/47.23 |
| 6,431,556 | B1 | * | 8/2002 | Beardsley et al. | ........... 280/1.5 |
| 2001/0040350 | A1 | * | 11/2001 | Allen et al. | ................... 280/1.5 |
| 2004/0050636 | A1 | | 3/2004 | Forbes | |

* cited by examiner

*Primary Examiner*—Lesley D. Morris
*Assistant Examiner*—Marlon Arce-Diaz
(74) *Attorney, Agent, or Firm*—Wood, Herron & Evans, LLP

(57) ABSTRACT

A towable bag comprises a body having at least one wheel, a tow bar comprising a plurality of articulated sections, one end of the tow bar being releasably attached to the body of the bag and the second end of the tow bar being adapted to releasably engage a coupling means being worn by the user.

11 Claims, 7 Drawing Sheets

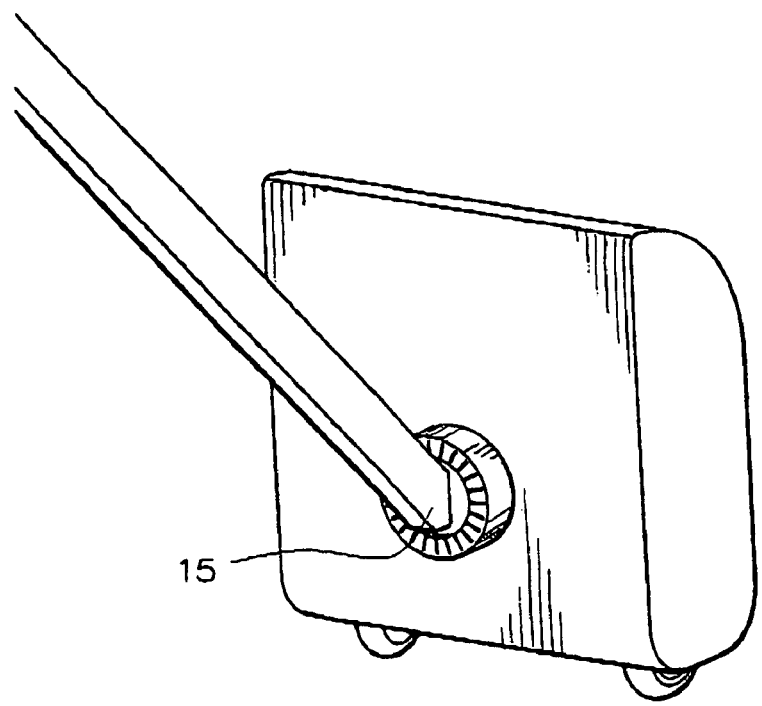
Fig.4A
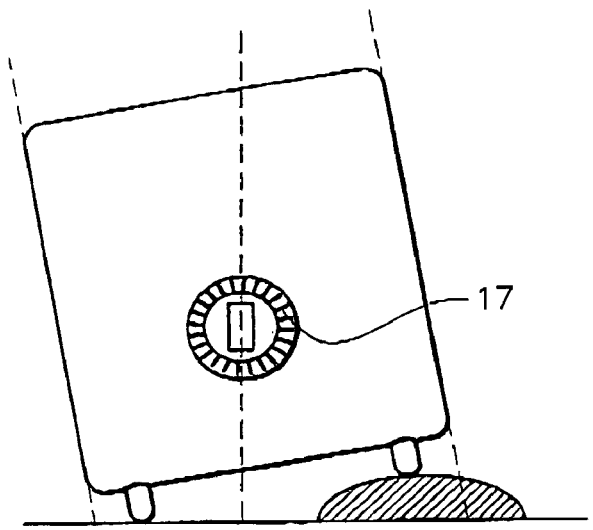
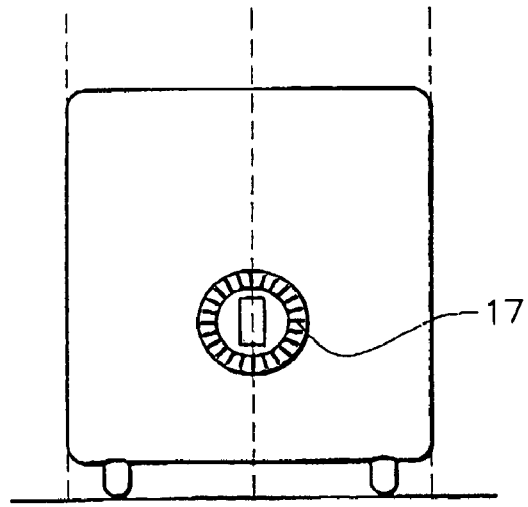
Fig.4B　　　　　　　　Fig.4C

TOWABLE BAG

FIELD OF THE INVENTION

This invention relates to a bag, and in particular to a bag that can be towed by a user in a particularly convenient manner.

BACKGROUND

Carrying excessive weight using backpacks has been recognized as a major cause of back pain among children and adults. Backpacks are popular among school children and adults because they are easy to use and do not require one's hands for operation. However, there are health concerns arising from the repetitive use of back packs when loads in excess of 10–15% of one's body weight are carried on the back for extended period. Wheeled bags have been designed in an attempt to relieve the back and shoulders from bearing most of the weight. However, existing wheeled bag designs have some disadvantages.

Wheeled backpacks and wheeled bags are not as popular as traditional backpacks and bags for a number of reasons, such as: (i) they are operated by hand and therefore appear as being impractical; (ii) they need to be supported and controlled actively by one hand to maintain balance; (iii) a significant part of the weight is born by the arm which may be stressed after extended operation; and (iv) pulling a wheeled device by hand while walking interferes with correct body posture and may also induce stress on the shoulder and spine.

SUMMARY OF THE INVENTION

The present invention provides a towable bag comprising a body having at least one wheel, a tow bar comprising a plurality of articulated sections, a first end of the tow bar being releasably attached to the body of the bag and a second end of the tow bar being adapted to releasably engage a coupling means being worn by the user.

Preferably the articulation in the tow bar is such that two adjacent articulated sections may rotate about a vertical axis when the first end of the tow bar is attached to the body of the bag and the second end of the tow bar is engaged with the coupling means worn by the user.

In one embodiment the joint between any two adjacent sections of the tow bar includes locking means for locking the two sections of the tow bar in a fixed position relative to each other.

A flexible coupling may preferably be provided between the tow bar and the tow bar coupling to allow for movement in the horizontal and vertical planes when the first end of the tow bar is attached to the bag and the second end of the tow bar is engaged with the coupling means worn by the user.

Preferably the coupling means is adapted to fit onto a belt worn by the user.

Preferably the first end of the tow bar may be connected to the bag using a coupling allowing rotation of the bag relative the tow bar.

The articulated joints in the tow bar are preferably arranged to allow the bag to be held adjacent to the user without the need to release the first end of the tow bar from the coupling means or the second end of the tow bar from the bag.

The coupling means may be magnetic, electromagnetic or mechanical in nature.

In an alternative embodiment there is provided a towable bag as described above wherein the body of the bag is provided with two or more means for releasable engagement with a tow bar, enabling a user to tow several bags at once in a line, each bag connected to another bag by a tow bar.

BRIEF DESCRIPTION OF THE DRAWINGS

Some embodiments of the invention will now be described by way of example and with reference to the accompanying drawings, in which:

FIGS. 4a, 4b and 4c show a bag-coupling device designed to reduce the amount of torsion forces from being transferred from the bag to the user waist.

DETAILED DESCRIPTION

Figure 1:
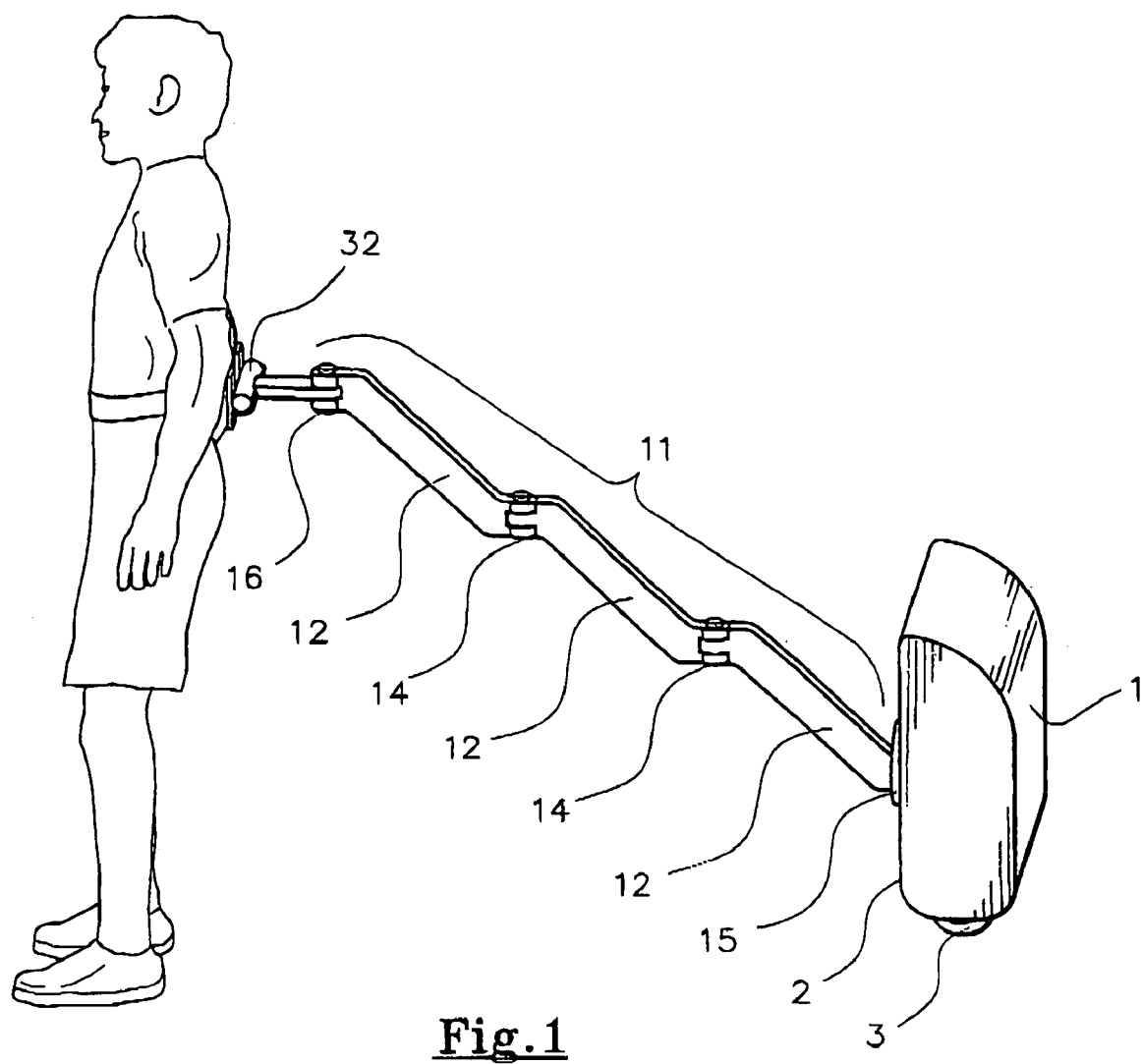
FIG. 1 is a side view of the towable bag assembly according to an embodiment of the present invention.

Referring now to FIGS. 1 to 4 a preferred embodiment of the present is shown. The towable bag consists of a wheeled bag 1 having at least one wheel 3 and a stop (not shown), so that when not being towed the bag 1 rests in a stable and upright position. Connected to the bag 1 is a foldable tow system. The foldable tow system includes a tow bar having at least two sections 12 connected to each other with an articulated joint 14. A first end 15 of the tow bar is connected to a side 2 of a wheeled bag 1, while at the second end 16 of the tow bar 11 there is a flexible joint 18 connected to a coupling system 40 to connect the tow bar to a waistband 30 worn by the user as will be described in more detail below.

The sections 12 are substantially rigid so as to provide a degree of control of the bag 1 being towed, though some degree of flexibility may be included by appropriate choice of material in order to minimize shocks and vibrations being passed to a user. The sections 12 are joined together by an articulated joint 14 providing rotation substantially about the vertical axis when the tow bar 11 extends from the bag 1 to the waistband 30 worn by the user. The articulated joints 14 of the tow bar 11 enable the tow system to be folded or to bring the bag 1 closer to the user when desired (as shown for example in FIG. 3). This articulation in the tow system enables the user to move objects in or out of the bag 1 with ease by bringing the bag 1 to the user's side. This would be particularly useful when standing in crowded spaces (e.g. in an elevator). A particular advantage of this arrangement is it allows the user's body to rotate freely when walking.

The articulated joints 14 of the tow bar 11 may include locking means for locking two sections 12 of the tow bar in a fixed position relative to each other. This is particularly useful for example when the user is walking downhill. In such a situation locked articulation joints 14 will prevent the tow bar from folding when the bag is rolling downhill.

Figure 8:
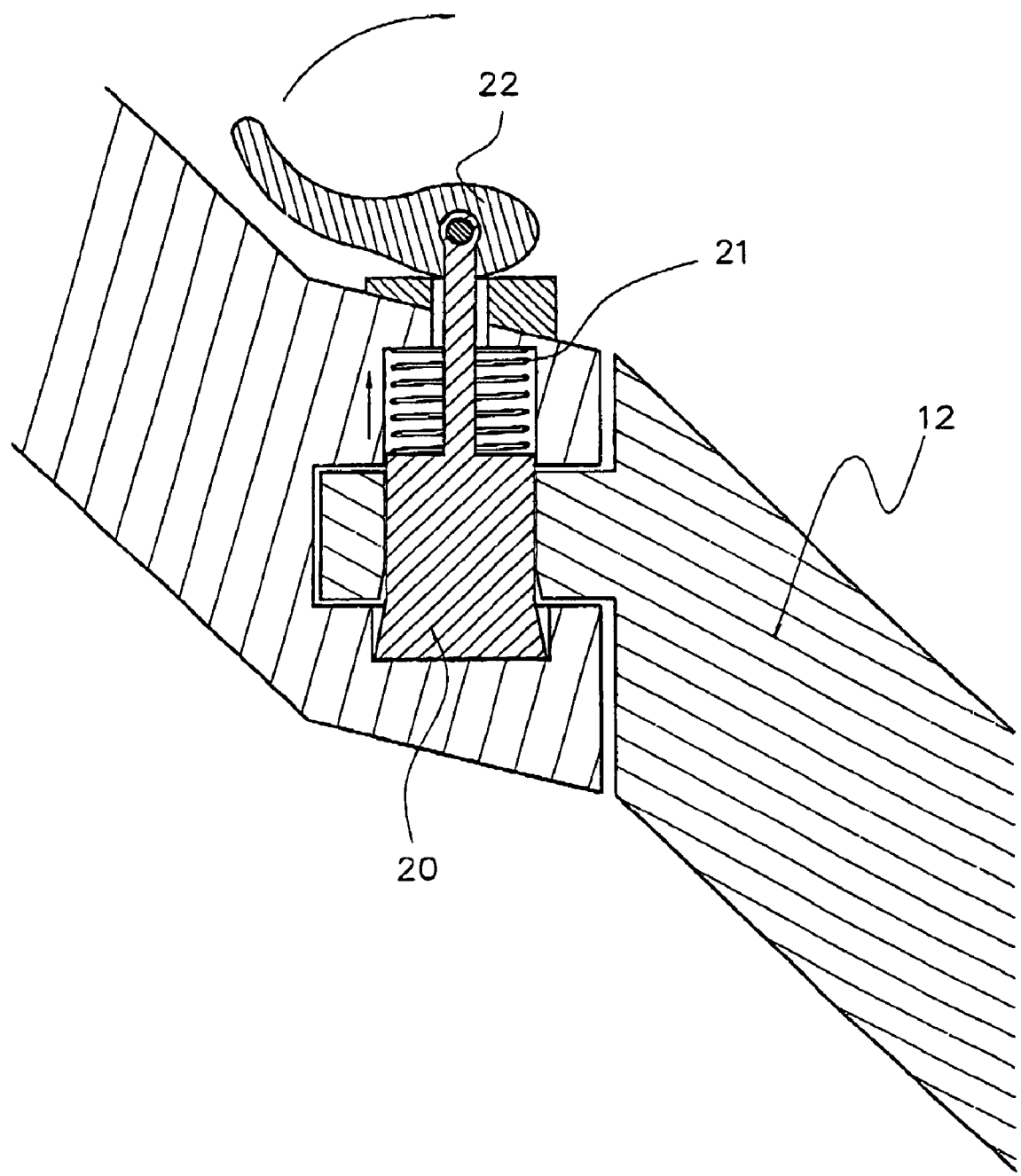
FIG. 8 is a cross sectional view of one embodiment of a locking mechanism located at the articulation joint between two sections of the tow bar.
Figure 9A:
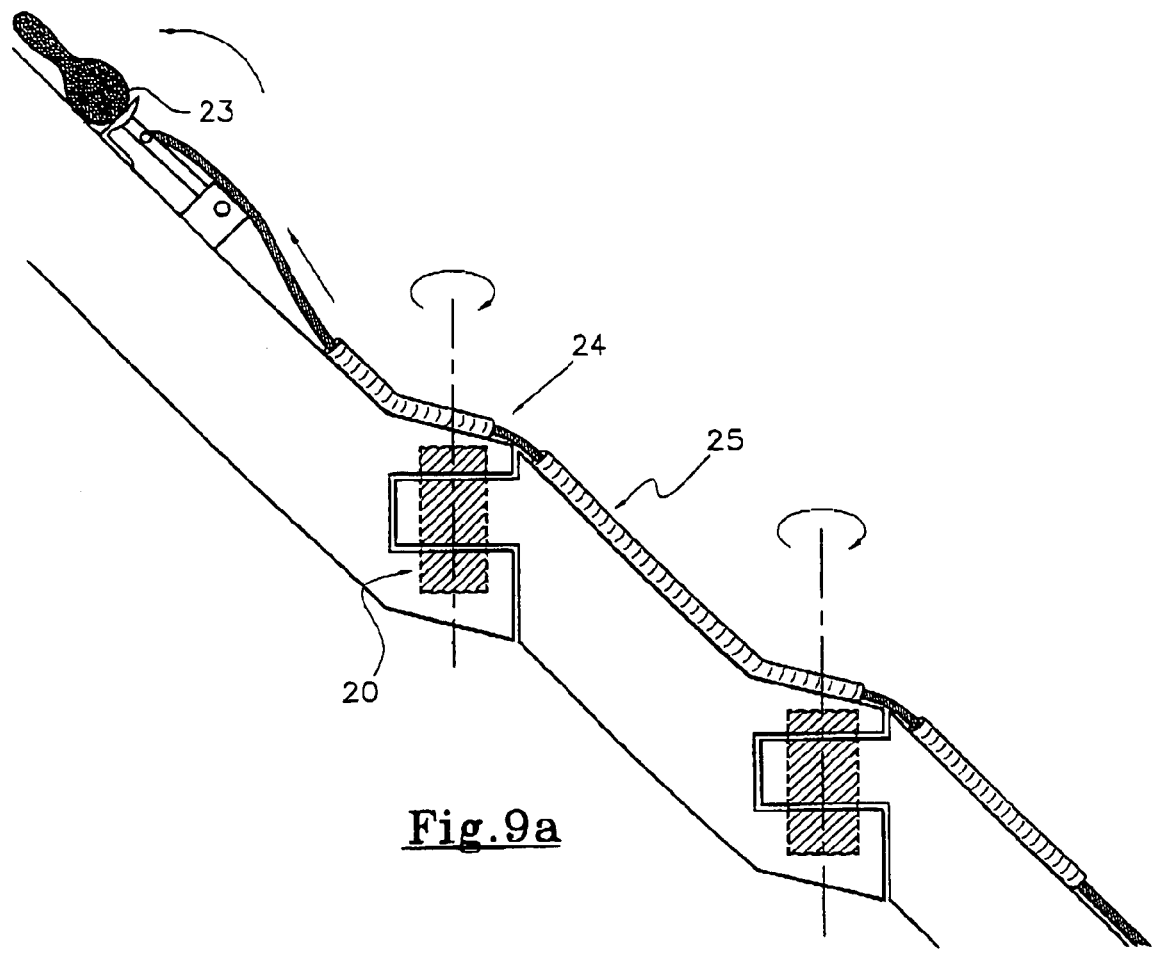
FIGS. 9a, 9b and 9c are cross sectional views of a second embodiment of a locking mechanism located adjacent to the articulation between two sections of the tow bar.

While means for locking articulation joints will be known to those skilled in the arts examples would include those as shown in FIGS. 8 and 9*a*.

FIG. 8 shows a cross-sectional view of a lockable articulation joint consisting of a central cylindrical core 20 connecting two bars 12, a spring 21, and a top latch 22 with an oval geometry. By changing the position of the latch 22, the cylindrical core 20 may be raised or lowered. The lower part of the cylindrical core 20 is slightly flared so that when it is raised up, the increased friction prevents the joint from rotating freely.

Figure 9B:
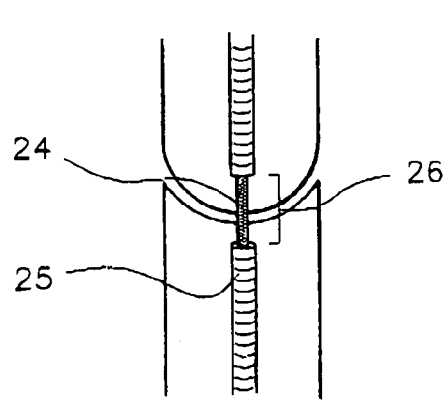
Figure 9C:
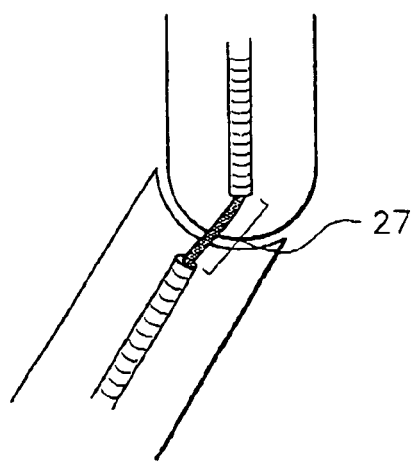

FIG. 9*a* shows the second end portion of a tow bar with two lockable articulation joints which prevent the tow bar from folding (e.g. when a user is walking downhill). This mechanism allows multiple joints to be locked simultaneously by engaging a latch 23 near the second end of the tow bar within easy reach of the user's hand. In this embodiment, a cylindrical conduit 25 is securely attached along the top middle portion of each bar section 12. The length of the conduit 25 is slightly shorter than the length of the bar section 12 and the conduit 25 has two open ends. A high strength elongate material 24 runs through all of the conduits and one end of the elongate material 24 is attached to the bag and the other end is tied to a latch 23 near the second end of the tow bar. As seen in FIGS. 9*b* and 9*c*, when two connecting bar sections deviate from linear alignment, the distance between two adjacent open ends of the cylindrical conduit is increased, so that the connected bar sections may only rotate freely when the elongate material 24 is slack. When the latch 23 (as shown in FIG. 9*a*) is engaged, the elongate material 24 is tightened and the increased tensional force of the string prevents the two adjacent ends of the cylindrical conduit 25 from moving apart. In addition, the tension in the string 24 pulls the bar sections closer to each other and causes the joint to tighten and therefore articulation is restricted.

The cylindrical conduit may be placed either on the top or under the tow bar; the conduit may also be drilled or moulded within the tow bar with openings near the bar section ends.

The waist coupling 31 worn by the user may be integrated with a custom waistband 30 or may fit onto a conventional belt worn by the user. The waistband 30 may also have straps or suspenders (not shown) that pass over the shoulders of the user to spread the load applied to the user.

The coupling system 40 includes a waist-coupling 31 attached to the waistband 30 and tow bar coupling 32 which is releasably engageable with the waist coupling 31. This releasable engagement allows the user to connect the waistband 30 to the tow bar 11 without the user having to remove and replace the waistband 30.

Figure 2:
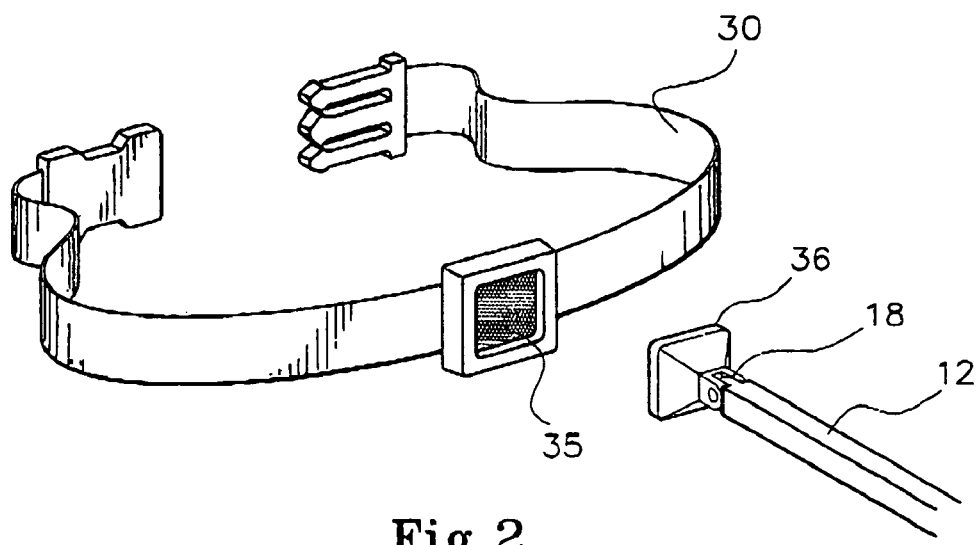
FIG. 2 is a perspective view of the upper end of the tow system near the waistband.

As shown in FIG. 2 the coupling system 40 may be in the form of a pair of magnets or electromagnets. In this embodiment the waist-coupling 31 is a magnet 35 that is attached to the waistband 30. The tow bar coupling 32 is a complementary magnet 36 and is attached to the flexible joint 18, which in turn is connected to the tow bar. The flexible joint 18 allows the tow bar to move relative to the coupling system 40 without subjecting the coupling system 40 to excessive loads. The coupling system 40 is designed to be strong enough to pull a loaded bag but weak enough to allow a safe separation of the tow bar from the waistband 30 should a stronger than intended force be exerted on the bag 1.

The length and angle of the tow system (the tow system comprising the tow bar 11, the coupling system 40, the first end of the tow bar 15, and optionally the bearing 17) is adjustable so that the wheeled bag 1 is capable of following the user at a short distance such that it does not interfere with normal walking (for example the length and number of sections 12, and the height at which they are fixed to the bag). The adjustments depend on the height of the user, the size and height of the wheeled bag and the step length (about 0.75 m for normal adults) of the user.

Torsion forces are created when the bag 1 is rolled on rough ground and will be transferred to the waistband 30 via the tow system 10. There are several ways to compensate for the torsion forces when the bag 1 is being towed on uneven ground. One solution is to use elastic material (e.g. plastics) in the fabrication of the tow system 10 to absorb some of the torsion forces when imbalance occurs. In another solution the tow bar is connected to a point nearer to the bottom of the bag to reduce lateral movement of the tow system 10 relative to the waistband 30. Yet another solution is to use larger shock-absorbing wheels 3 to dampen the effect of rough surface on the bag's stability. In an alternative embodiment the connection between the first end 15 and the side 2 of the bag 1 is in the form of a bearing 17 that allows rotation of the bag 1 around the tow bar.

With the tow bar connected to the waistband 30 by means of the coupling system 40, the bag I may be dragged forward while the wheels 3 carry most of the bag's 1 weight. For a two-wheel towable bag design the tow system 10 may provide some lifting so that the stop of the bag 1, which is in contact with the supporting surface at rest, is raised above ground. With such an arrangement the pair of wheels 3 carries most of the weight and only a small part of the weight of the bag 1 is supported by the tow system 10. In a three or more wheeled system the weight of the bag 1 is carried on the wheels 3 and the tow system 10 provides the towing forces to the bag 1.

Figure 5A:
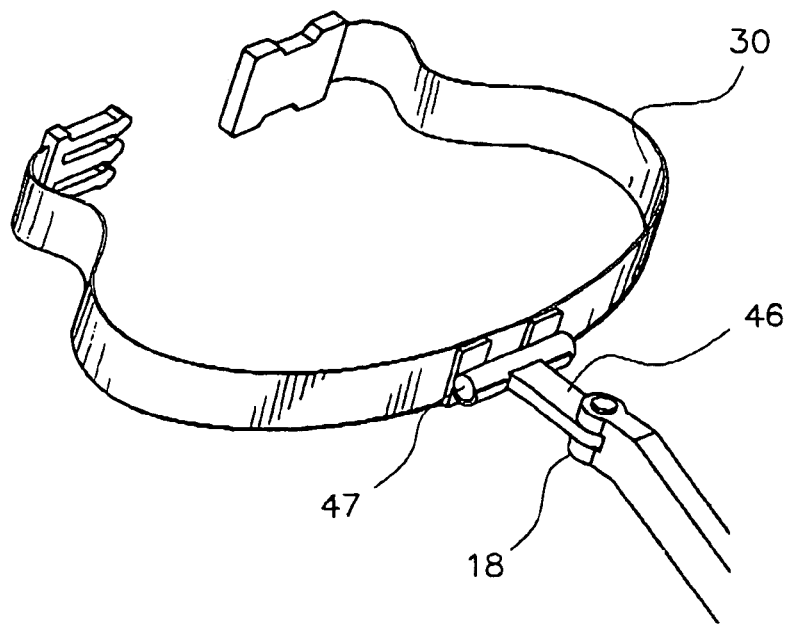
FIGS. 5a–c show an alternative coupling device designed to connect the tow system with the back of the user.
Figure 5B:
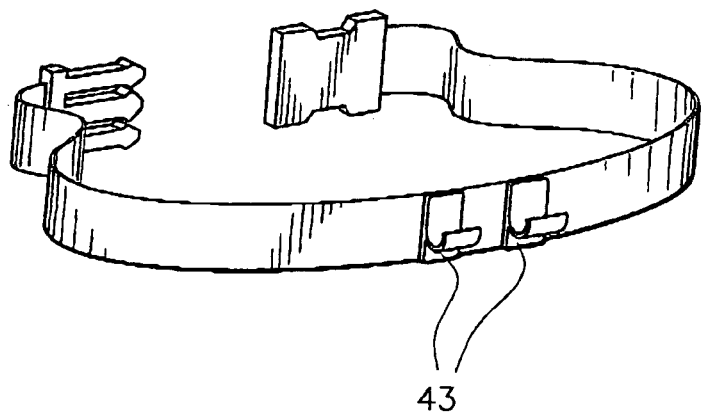
Figure 5C:
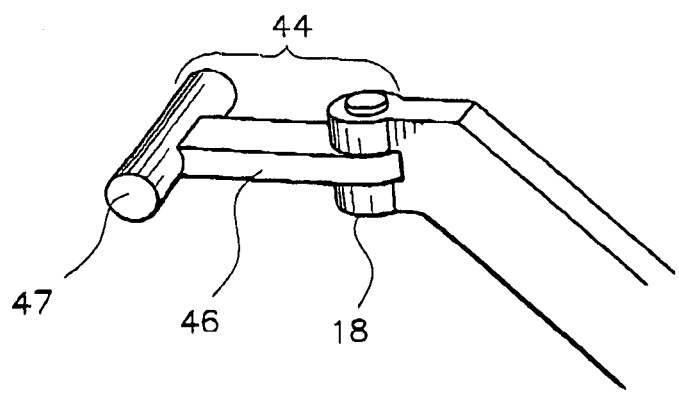

Referring now to FIG. 5, in an alternative embodiment of the present invention the coupling system 40 is a mechanical arrangement. On the waistband 30 the waist coupling 31 is a pair of U shaped members 43. The tow bar coupling is in the form of a T-piece 44 with a shaft 46 connected to the flexible coupling 18 and a bar 47 being located at the opposed end of the shaft 46 to the flexible coupling 18 and extending evenly on two sides of the shaft 46. The T-piece 44 interconnects with the U shaped members 43. By allowing the T-piece 44 to be placed into the U shaped members 43 the tow bar can be quickly connected or disconnected from the waistband 30. This arrangement also allows for the U shaped members 43 to separate from the T-piece 44 when the bag 1 is pushed from behind, minimizing the chance of injury to the user.

The height of the wheels 3 and the dimensions of the bag 1 can be selected to ensure that a vertical line passing through the center of gravity, falls between the pair of wheels 3, so that the stability of the bag 1 is increased.

Figure 6:
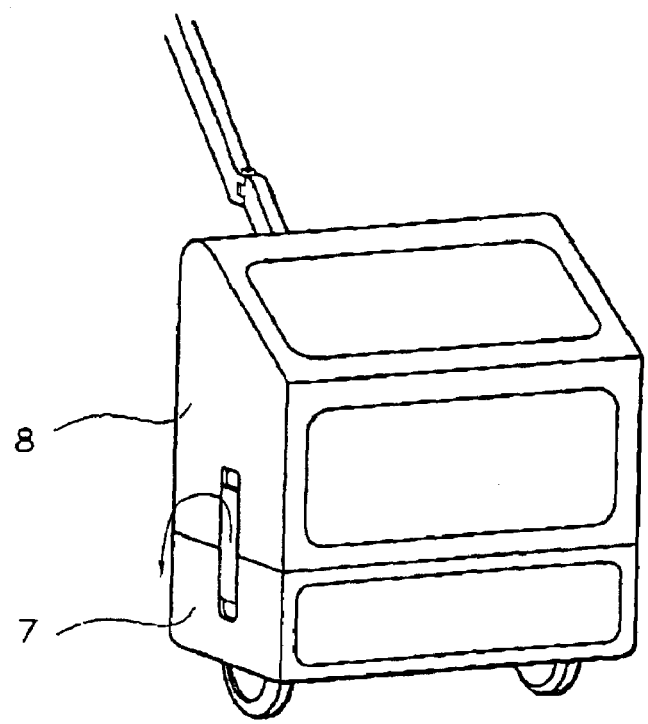
FIG. 6 is a perspective view of the tow system according to one embodiment and comprising one lower lockable compartment and an upper compartment that may be a detachable backpack.

Referring now to FIG. 6 in an alternative aspect of the present invention the bag 1 may comprise multiple compartments 7,8 to facilitate storage of transported objects and to aid in weight distribution.

The multiple compartments may include a bottom compartment 7, designed as a small lockable bag for the storage of heavy items such as books. The bottom compartment 7 may be locked and kept in the hallway of schools. An upper compartment 8 may be provided as a detachable backpack 8 for the packing of lighter items or valuables. This detachable backpack 8 may be placed on top of the bottom compartment 7 and the bag 1 can be towed as necessary. The separation between heavy and light compartments allows users to carry a much lighter backpack 8. This also has the advantage of lowering the center of gravity of the bag 1 adding to the stability of the bag 1.

Figure 3:
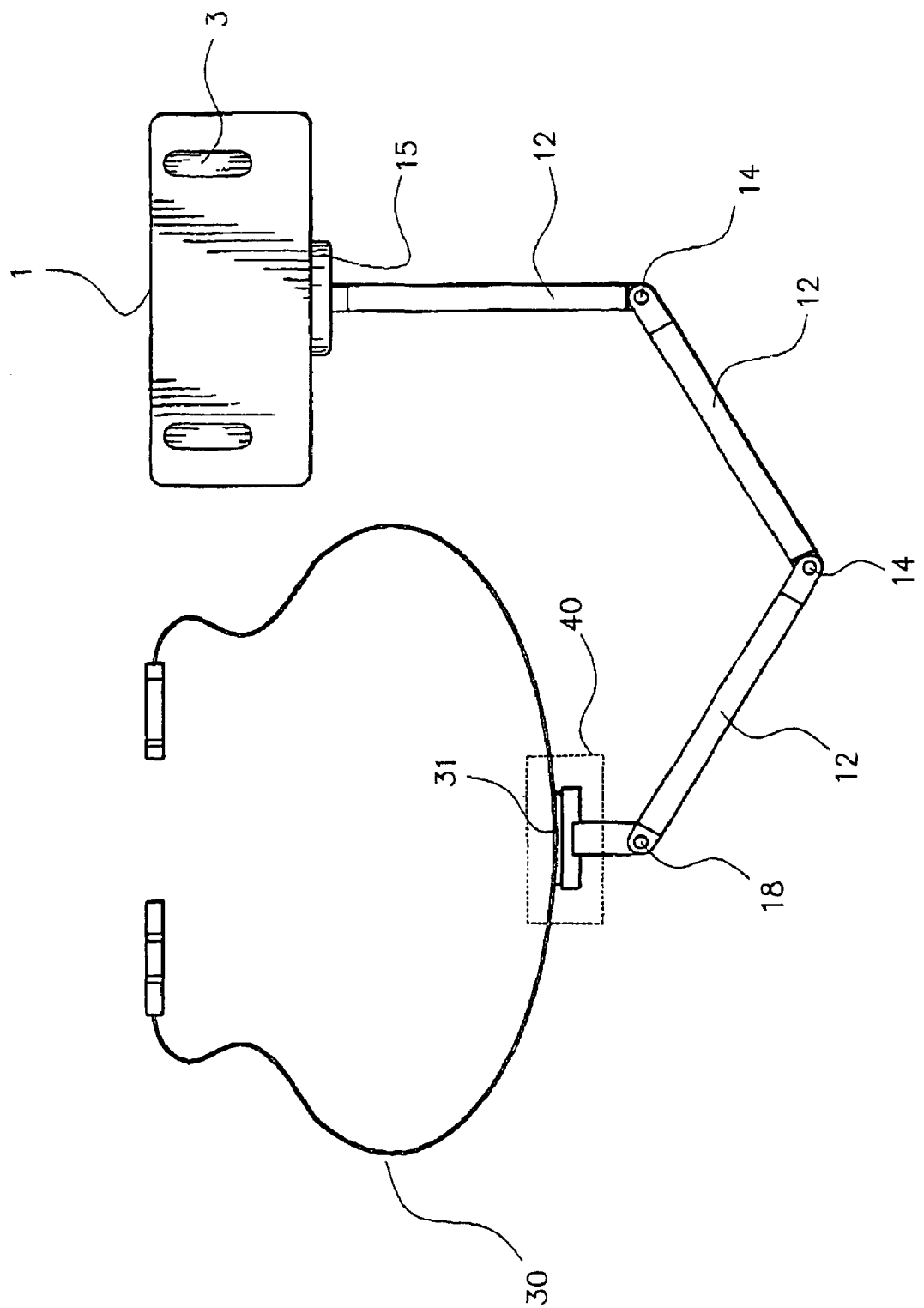
FIG. 3 is a cross-sectional view seen from the top showing how the articulated sections are moved to enable access to the bag's contents.
Figure 7:
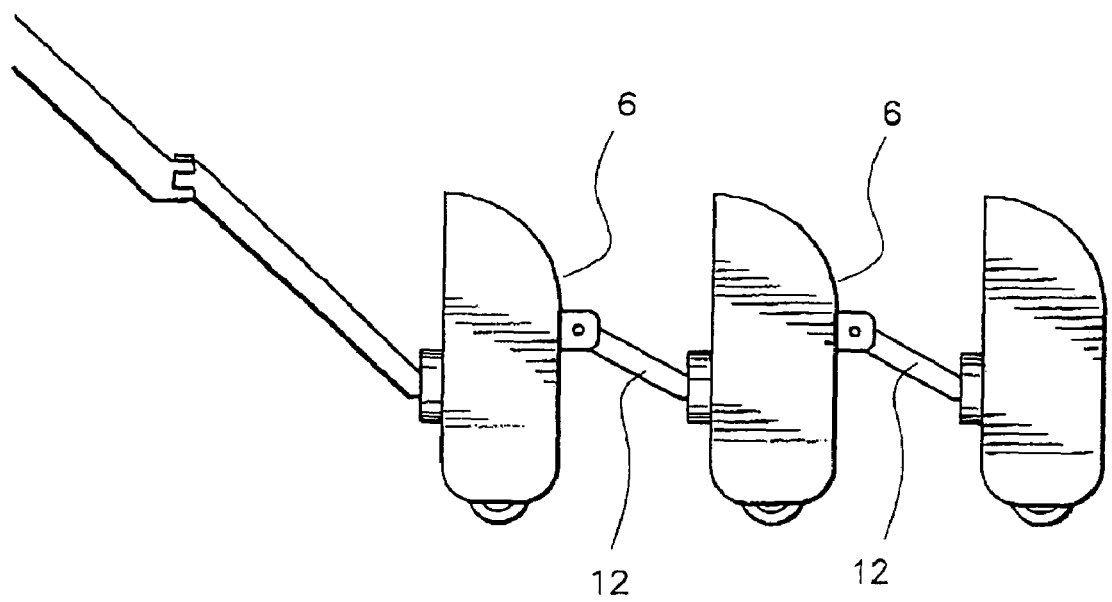
FIG. 7 is a perspective view of the tow system showing how one user may tow multiple bags at the same time.

FIG. 7 shows that in yet another aspect of the present invention it is possible that multiple bags are towed at the same time in a chain fashion. In this embodiment the tow bar of a following bag is connected to a trailing face 6 of a preceding bag and so on in turn until the tow bar is connected to the coupling system 40 and the waistband 30 (as shown in FIG. 3) worn by the user towing the bags.

It would be understood by a person skilled in the art that variations on the above description are possible and still falling within the spirit and scope of the present invention.

The invention claimed is:

1. A towable bag comprising:
   a body having at least one wheel, a first tow bar comprising a plurality of articulated sections, a first end of the first tow bar being releasably attached to the body of the bag and a second end of the first tow bar being adapted to releasably engage a coupling means being worn by the user;
   wherein the articulation in the first tow bar is such that two adjacent sections may rotate relative to a vertical axis when the first end of the first tow bar is attached to the body of the bag and the second end of the first tow bar is engaged with the coupling means worn by the user;
   wherein the joint between any two adjacent sections of the first tow bar includes locking means for locking the two sections of the first tow bar in a fixed position relative to each other.

2. A towable bag according to claim 1 wherein at the second end of the first tow bar there is a flexible coupling allowing movement in the horizontal and vertical planes when the first end of the first tow bar is attached to the bag and the second end of the first tow bar is engaged with the coupling means worn by the user.

3. A towable bag according to claim 1 wherein the coupling means is adapted to fit onto a belt worn by the user.

4. A towable bag according to claim 1 wherein the first end of the first tow bar is connected to the bag using a coupling allowing rotation of the bag relative to the first tow bar.

5. A towable bag according to claim 1 wherein the articulated sections in the first tow bar allow the bag to be held in close proximity to the user without the need to release the first end of the first tow bar from the coupling means or the second end of the first tow bar from the bag.

6. A towable bag according to claim 1 wherein the coupling means is magnetic or electromagnetic.

7. A towable bag according to claim 1 wherein the coupling means is mechanical.

8. A towable bag according to claim 1 wherein the bag comprises multiple compartments.

9. A towable bag according to claim 8 wherein at least one said compartment may be separated from the bag.

10. A towable bag according to claim 1 wherein the body of the bag is provided with at least a first and second means for releasable engagement with a tow bar, wherein the first means is adapted to releasably engage with the first tow bar, and the second means is adapted to releasably engage with a second tow bar for coupling to a second towable bag.

11. A towable bag comprising a body having at least one wheel, a first tow bar comprising a plurality of articulated sections, a first end of the first tow bar being releasably attached to the body of the bag and a second end of the first tow bar being adapted to releasably engage a coupling means being worn by the user;
   wherein the body of the bag is provided with a releasable engagement means, the engagement means adapted to releasably engage with a second tow bar attached to a second towable bag whereby two bags may be towed in a train by a single user.

* * * * *